United States Patent [19]
Hirsbrunner et al.

[11] Patent Number: 6,066,360
[45] Date of Patent: May 23, 2000

[54] PROVISION OF SUBSTRATES TREATED WITH METHYLSILICONATES FOR RETAINING SOIL WATER FOR PLANTS

[76] Inventors: Pierre Hirsbrunner, Cornalles 27, 1802 Corseaux, Switzerland; Ian Horman, Ch. de Baye 22B, 1807 Blonay, Switzerland

[21] Appl. No.: 09/099,284

[22] Filed: Jun. 18, 1998

[30] Foreign Application Priority Data

Jul. 3, 1997 [EP] European Pat. Off. ............... 97111134
Mar. 4, 1998 [EP] European Pat. Off. ............... 98103755

[51] Int. Cl.⁷ .............................. B05D 7/00; C09K 17/00
[52] U.S. Cl. ...................... 427/136; 427/212; 427/430.1; 405/263
[58] Field of Search ..................... 427/136, 137, 427/212, 215, 430.1, 421; 405/263

[56] References Cited

U.S. PATENT DOCUMENTS

| | | | |
|---|---|---|---|
| 2,923,095 | 2/1960 | Magimel-Pelonnier et al. | 47/58 |
| 3,731,493 | 5/1973 | Stevens | 61/35 |
| 4,027,428 | 6/1977 | Hillel | 47/58 |
| 4,125,673 | 11/1978 | Roth et al. | 428/447 |
| 4,243,563 | 1/1981 | Ferm | 260/17 |
| 4,556,505 | 12/1985 | Fenn | 252/194 |
| 5,288,177 | 2/1994 | Montgomery et al. | 405/264 |
| 5,383,943 | 1/1995 | Ogawa et al. | 47/58 |
| 5,443,633 | 8/1995 | Hirsbrunner et al. | 106/287 |
| 5,580,192 | 12/1996 | Ogawa et al. | 405/263 |
| 5,595,957 | 1/1997 | Bowey, et al. | 504/118 |
| 5,800,280 | 5/1999 | MacMullen | 427/258 |

FOREIGN PATENT DOCUMENTS 0657521  6/1995  European Pat. Off. ........ C09K 17/40

OTHER PUBLICATIONS

Emerick, et al., "Relation Between Soil Properties and Effectiveness of Low–cost Water–harvesting Treatments", Soil Sci. Soc. Am. J., vol. 51, pp. 213–219, (No Month) 1987.

Database Abstract, CAPLUS, Caesar Accession No. 1975: 465264 of Chemical Abstracts abstract of Plueddeman article, "Soil Treatment with silicones for water harvesting" (No Month) (1975).

*Primary Examiner*—Shrive Beck
*Assistant Examiner*—Jennifer Calcagni
*Attorney, Agent, or Firm*—Vogt & O'Donnell, LLP

[57] ABSTRACT

Compositions for application to a soil for retaining water in the soil for plants are prepared by applying an aqueous solution containing sodium and/or potassium methylsiliconate to a substrate so that the siliconate applied is in an amount of between 180 g and 1,000 g per $m^3$ substrate and then, the treated substrate is allowed to dry at ambient temperature. The substrates employed include tree bark, sawdust, compost and vegetable mould and also gravel and sand. Additionally, porous articles prepared for containing plants also may be treated for improving retention of water.

4 Claims, No Drawings

PROVISION OF SUBSTRATES TREATED WITH METHYLSILICONATES FOR RETAINING SOIL WATER FOR PLANTS

BACKGROUND OF THE INVENTION

The invention relates to the use of sodium methylsiliconate or potassium methylsiliconate with a substrate in order to render it water-repellent.

It is already known, in European Patent Application Publication No. 0 341 334, to carry out a soil treatment in order to render the said soil water-repellent. This treatment consists in spraying an emulsion based on silane polymer onto the soil. The desired solution according to this process consists in carrying out an in situ treatment directly on the soil to be treated. The article by W. E. Emmerich, which appeared in Soil Sc. Soc. Am. J., 1987, pages 213–219, relates to a means for treating the soil in order to render it water-repellent for the purpose of collecting the run-off water.

SUMMARY OF THE INVENTION

The aim of the present invention is to carry out an industrial treatment on a substrate and then, optionally, to provide the consumer with this pretreated and ready-for-use substrate. The consumer, for this reason, does not have to carry out any chemical handling operation.

The present invention relates to the use of sodium methylsiliconate or potassium methylsiliconate with a substrate in order to obtain a treated substrate which is at least partially water-repellent, so that the said substrate allows good water retention when it is applied to a soil to be protected or when it is on a soil to be protected or so that the substrate is impermeable to water.

To those ends, the present invention includes a process for the treatment of a substrate chosen from the group of sand, gravel, tree bark, sawdust, compost and vegetable mould, to which between 180 and 1000 g of sodium methylsiliconate or potassium methylsiliconate in aqueous solution per $m^3$ of the substrate are applied by mixing, the siliconate content being given with respect to the pure active principle, and the substrate so-treated is allowed to dry at ambient temperature.

Between 250 and 500 g of sodium methylsiliconate or potassium methylsiliconate are preferably mixed per $m^3$ of substrate, and the siliconate is used in water at a concentration of between 0.15 and 2%.

Additionally, the present invention includes a process for the treatment of a substrate which is a porous rigid article prepared for containing plants and to which is applied, by dipping or spraying, an aqueous solution containing from 0.25 to 5% of sodium methylsiliconate or potassium methylsiliconate and the substrate so-treated is allowed to dry at ambient temperature.

In a first embodiment of the invention, the reason for the application to a soil to be protected is that the soil contains a certain amount of water and the substrate thus deposited makes it possible to slow down the evaporation of the water from the underlying soil.

In a second embodiment of the invention, it is also possible to envisage an in situ treatment of the substrate by surface treatment of the soil in order to prevent the evaporation of water from the underlying soil.

In a third embodiment of the invention, the reason for rendering the substrate impermeable is also to slow down the evaporation of the water, for example in a flower pot.

DETAILED DESCRIPTION OF THE INVENTION

Sodium methylsiliconate or potassium methylsiliconate is normally sold in the aqueous solution form, for example of the order of 50% of active product. It is subsequently diluted to the desired concentration.

The substrate used is not critical. It is preferably chosen from the group composed of sand, gravel, tree bark, sawdust, compost, vegetable mould, a porous rigid material and soil. For the first embodiment, the substrate used is sand, gravel, tree bark, sawdust, compost and vegetable mould. For the second embodiment, the substrate is the soil. For the third embodiment, the substrate is the porous rigid material. This porous rigid material is preferably a pot which can contain plants and flowers, for example a terracotta pot.

The application of the sodium methylsiliconate or potassium methylsiliconate to the substrate is carried out by mixing, by dipping, by spraying or by sprinkling. In the first embodiment, mixing is carried out, in the second embodiment, sprinkling or spraying is carried out instead and, in the third embodiment, dipping or spraying is carried out.

Sodium methylsiliconate or potassium methylsiliconate makes it possible to render water-repellent the substrate according to the first embodiment. This semi-permeable or impermeable substrate (rendered partially or completely water-repellent according to the concentration of siliconate) is spread over the soil to be protected in the proportion of a layer with a thickness of 5 to 50 mm. Irrigation water is introduced at the surface, where it rejoins the untreated surface by gravity, by following hydrophilic routes (edge of the container or stems of the plants), or alternatively by passing through the semi-permeable substrate. The application of the substrate is very broad. It can be applied to any soil to be protected. Soil to be protected is understood to mean any type of soil on which it is desired to reduce the evaporation of water. It is thus possible to envisage it either in house plants, thus in pots or tubs, or on areas of land, such as, for example, a golfing green, tree nurseries, orchards or other plantations.

The treated substrate, which is dry in appearance, slows down to a notable extent the evaporation of moisture originating from the underlying earth, pro rata with the thickness of the substrate layer.

A retention power R is defined in the following way: Amount of water remaining in the soil with respect to the amount of water normally evaporated under the same weather conditions (wind, temperature, time) for a soil without the substrate. R is expressed as % and the values are given in Table 1

TABLE 1

| Thickness | Retention R |
| --- | --- |
| 5 mm | 26% |
| 10 mm | 63% |
| 15 mm | 85% |
| 20 mm | 96% |

A good water retention is thus found to be already achieved with a thickness of 10 mm.

The advantage of this process is that mixing can be carried out at ambient temperature and the substrate can be left to dry at ambient temperature. This would not be the case if the silane polymer as recommended in European Patent Application Publication No. 0 314 344 were used. This is because, in this case, it would be necessary to heat at a temperature of the order of 60° C. for 6 hours in order to allow the polymer to react with the substrate.

The invention thus makes available a rapid and efficient means for the preparation of a water-repellent substrate. It is then possible to envisage, as application, carrying out this water-repelling treatment on sand, which is packaged in 3, 5 or 10 kg bags and which is sold in garden centres. This sand which has been rendered water-repellent can be used for house plants, for tub plants and in gardens. It has been generally found that the use of this substrate makes it possible to reduce the frequency of watering by a factor of 4 to 7.

As non-limiting examples of plants on which the treated substrate can be are:

a) Plants requiring plenty of water:
House plants: Philodendron (*Monstera deliciosa*)
 Papyrus (*Cyperus alternifolius*)
 Coleus (Codiaeum "Reidil")
 Dieffenbachiae
Tub plants: Geraniums, Petunias or Chives
Garden plants: Lettuces b) Plants requiring moderate but constant humidity:
House plants: During winter
Tub plants: Parsley, Sage, Ivy, Rosemary and the like
Garden plants: Raspberry bush, Blackberry bush or Tree nurseries.

c) Fruit trees or others, such as palm trees and lemon trees.

In the second embodiment, the invention relates to a process for the treatment of a substrate which is the soil, in which an in situ treatment of the soil is carried out by sprinkling or by spraying onto the soil an amount of sodium methylsiliconate or potassium methylsiliconate such that an amount of between 25 and 200 kg of methylsiliconate per hectare is applied. The solution is taken to the desirable dilution, taking into account the depth of the soil to be treated and the nature of this soil.

In the third embodiment wherein a porous rigid material, such as a pot, is treated, by dipping or spraying, in the case of the dipping, both the outer and inner surfaces of the pot have been rendered water-repellent. In the case of the spraying, it is possible to envisage spraying a single surface or both surfaces.

The great advantage of the present invention is that of rendering impermeable the terracotta pot and, in addition, of providing for a substrate, such as sand, which is also treated. It is thus possible to prevent the evaporation of water, both via the pot and via the vegetable mould in which the plant or the flower is found and on the treated soil. This treatment does not stop the aeration mechanism.

EXAMPLES

The continuation of the description is made with reference to the following examples.

Example 1

The substrate is sand 50 g of potassium methylsiliconate are dissolved in 35 l of water (concentration of 0.15%) and is added to 170 kg of sand (100 l) (which corresponds to 500 g of siliconate per m$^3$ of sand). Mixing is carried out at ambient temperature and the mixture is left to dry at ambient temperature. Semi-permeable sand is then obtained. The storage time or a higher temperature does not modify the quality of the sand, the reaction being immediate at dryness and at ambient temperature.

To obtain a completely water-repellent preparation, it is sufficient to increase the siliconate charge to 75 g in the above example.

The sand thus rendered water-repellent is used as a 15 mm layer which is applied respectively to Papyrus, Coleus and Parsley plants arranged in earth which has been dampened beforehand.

The following results are obtained with respect to watering:
Papyrus: Without the substrate, watering every 2 days
 With the substrate, twice monthly only
Coleus: Without substrate, watering every day
 With the substrate, once weekly only
Parsley: Without substrate, 1–2 times weekly
 With the substrate, once monthly.

The invention thus makes available a means which allows a substantial saving of water to be achieved and the frequency of watering operations of soil thus covered with treated substrate to be decreased.

Example 2

The substrate is a terracotta pot

A terracotta pot with a volume of 600 ml and an internal diameter of 124 mm is used. Various potassium methylsiliconate solutions are prepared and the pot is immersed for 5 minutes under cold conditions and it is subsequently left to dry for 12 hours at ambient temperature.

The pots are subsequently charged with 500 ml of tap water and the transfer of water through the walls of the pot after 1, 2 and 3 days is quantified. The results are shown in Table 2:

TABLE 2

| Siliconate concentration % | After 1 day | After 2 days | After 3 days | Average /day |
|---|---|---|---|---|
| 0 | 118.9 g | 252.1 g | 364.2 g | 121.4 g |
| 0.05 | 69.3 g | 146.3 g | 222.9 g | 74.3 g |
| 0.25 | 14.1 g | 31.1 g | 43.1 g | 14.4 g |
| 0.5 | 0 | 0 | 0 | 0 |
| 1 | 0 | 0 | 0 | 0 |

A decreased transfer effect is thus already observed with a concentration of 0.25% in the case of a terracotta pot.

Example 3

Treated pot containing treated sand

Pots with a diameter of 10 cm are used. Sample 1 is untreated, Sample 2 is treated with potassium methylsiliconate on both the outer surface and the inner surface and Sample 3 is vitrified on both its faces.

Each pot is charged with 120 g of orchid peat with a moisture content of 50% and a further 70 g of water are added thereto in order to saturate the soil. To evaporate these 70 g of water, 3 days are necessary for the first sample, 10 days for the second and 11 days for the last.

The treatment according to the invention thus results in a pot which is as impermeable as if it had been vitrified.

If a 15 mm layer of sand which has been rendered water-repellent with the siliconate of Example 1 is now deposited on the surface of the soil, the following result is achieved. For Sample 1, the 70 g of water are evaporated in 3 days, for sample 2 in 23 days and for the last in 27 days.

What is claimed is:

1. A process for treating a substrate to obtain a treated substrate for subsequent application to a soil to retain water in the soil wherein the process comprises the steps of:

a) applying an aqueous solution containing a substance selected from the group consisting of sodium methylsiliconate and potassium methylsiliconate to a substrate, wherein the substrate consists essentially of a material selected from the group consisting of treebark, sawdust and vegetable mould, to obtain a treated substrate and wherein the substance is contained in the solution applied in an amount and the solution is applied so that between 180 grams and 1,000 grams of the substance per m$^3$ substrate is applied to the substrate to obtain a treated substrate; and b) allowing the treated substrate to dry at ambient temperature to obtain a dried treated substrate.

2. A process according to claim 1 further comprising packaging the dried treated substrate for provision to a consumer.

3. A process according to claim 1 wherein the substance is contained in the aqueous solution in a concentration, by weight, of between 0.15% and 2%.

4. A process according to claim 1 wherein the substance is contained in the solution in an amount and the solution is applied so that between 250 g and 500 g of the substance per m$^3$ substrate is applied to the substrate.

* * * * *